United States Patent [19]

Vottis et al.

[11] Patent Number: 5,624,189

[45] Date of Patent: Apr. 29, 1997

[54] TEMPERATURE EMULATING SYSTEM FOR DETERMINING THE TEMPERATURE OF GUN AMMUNITION PROPELLANT

[75] Inventors: Patrick M. Vottis; Philip C. Wheeler, both of Schenectady; John M. Kenna, Rensselaer; Karol A. L. Madulka, Ballston Spa, all of N.Y.

[73] Assignee: The United States of America as represented by the Secretary of the Army, Washington, D.C.

[21] Appl. No.: 370,134

[22] Filed: Jan. 9, 1995

[51] Int. Cl.$^6$ .............................. G01K 1/16; G01K 13/00; F41A 31/00

[52] U.S. Cl. .............................. 374/141; 73/167; 42/1.01; 102/481

[58] Field of Search .............................. 374/141, 208; 73/167; 102/481; 89/1.703, 30; 42/1.01, 1.05

[56] References Cited

U.S. PATENT DOCUMENTS

| | | | |
|---|---|---|---|
| 3,575,085 | 4/1971 | McAdam, Jr. | 89/41.01 |
| 3,902,368 | 9/1975 | Hasenbein et al. | 73/167 |
| 3,956,966 | 5/1976 | French | 374/178 |
| 5,024,136 | 6/1991 | Bock | 89/6 |

*Primary Examiner*—Diego F. F. Gutierrez
*Attorney, Agent, or Firm*—Saul Elbaum; Edward Goldberg; Michael C. Sachs

[57] ABSTRACT

An ammunition temperature emulating system is provided for use in a tank which carries ammunition. The temperature of the ammunition (which comprises liquid propellant) is needed to be known for firing accuracy. The temperature is indirectly approximated by measuring the temperature of the wall of the chamber in which the ammunition is stored, using a simulating thermal insert. The system includes a gauge having a sensor bulb, a vacuum bottle having a cavity receiving the sensor bulb and receiving the simulating thermal insert.

4 Claims, 3 Drawing Sheets

1

TEMPERATURE EMULATING SYSTEM FOR DETERMINING THE TEMPERATURE OF GUN AMMUNITION PROPELLANT

GOVERNMENTAL INTEREST

The invention described herein may be manufactured, used and licensed by or for the Government for governmental purposes without the payment to us of any royalties thereon.

FIELD OF THE INVENTION

The invention generally relates to a temperature emulating system, and in particular the invention relates to any gun system having ammunition and to a temperature emulating system having an emulator device which has a-sealed cavity with a thermal insert that conforms its temperature about equal to the temperature of the ammunition.

BACKGROUND OF THE INVENTION

The prior art temperature emulating system includes a temperature gauge which is mounted on a casing of a tank and which is disposed next to a gunner area in a crew compartment and which has a conductor, and includes a sensor bulb which has terminals connected to the conductor and which is mounted on the casing and which is disposed in an ammunition storage compartment of the tank.

One problem with the prior art temperature emulating system is that the sensor bulb senses the temperature of its surrounding air and such temperature does not fully conform to the temperature of the ammunition.

SUMMARY OF THE INVENTION

According to the present invention, a temperature emulating system is provided. This system comprises a temperature gauge having a first terminal, a conductor connected to the first terminal, a sensor bulb having a second terminal connected to the conductor a bottle having an axis and having a cavity containing the sensor bulb, a thermal insert coaxially disposed in the cavity adjacent to the sensor bulb and closing an open end of the bottle, a lid having an adapter which is in sealing engagement with the bottle and having a gasket in sealing engagement with the thermal insert, and a connector coaxially connected to the lid.

By using a bottle which sealingly encloses the sensor bulb and by using a thermal insert which is disposed inside the bottle and which closes the bottle, the sensor bulb can sense the temperature of the sealed-in thermal insert which copies the temperature of sealed-in ammunition propellant.

One object of the present invention is to improve tank gun firing accuracy.

Another object is to determine the temperature of tank gun ammunition propellant which plays a significant role in gun firing accuracy.

A further object is to provide an emulator system which copies the temperature of a tank gun ammunition propellant and which provides a measurement of the temperature as copied.

BRIEF DESCRIPTION OF THE DRAWINGS

The foregoing and other objects, features and advantages will be apparent from the following description of the preferred embodiment of the invention as illustrated in the accompanying drawings.

DESCRIPTION OF THE PREFERRED EMBODIMENT

Figure 1:
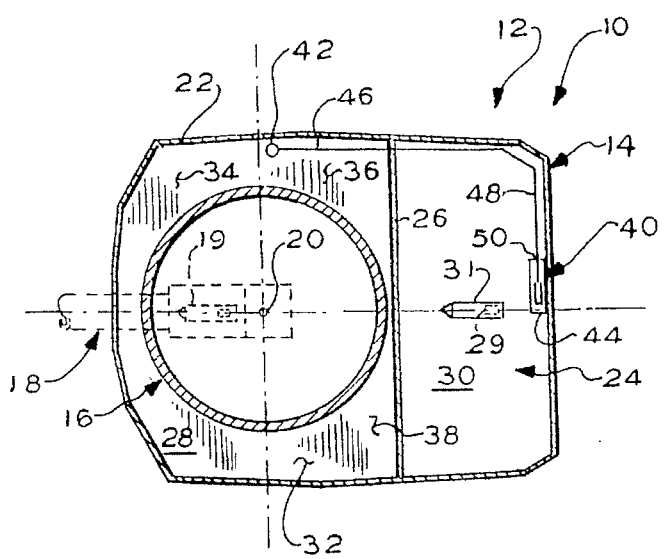
FIG. 1 is a plan section view of a tank having a temperature emulating system according to the present invention.

As shown in FIG. 1, a vehicle or tank 10 is provided. Tank 10 has a lower portion or frame 12, an upper portion or housing 14, and a gun turret 16, which has a gun 18 with ammunition 19. Turret 16 is angularly displaceable relative to upper portion 14 about a turret axis 20.

Upper portion 14 has a casing or wall 22, which encloses a chamber 24. Chamber 24 has a folding partition 26, or the like, which divides chamber 24 into a crew compartment 28, and an ammunition storage compartment 30 with stored ammunition 31. Crew compartment 28 has a floor 32, which has a gunner area 34, a commander area 36, and a loader area 38. Ammunition 31 has propellant 29.

Tank 10 also has an ammunition temperature emulating system 40. System 40 has an ammunition temperature gauge 42 which is mounted on casing 22. System 40 also has an ammunition temperature emulator device or emulator 44. Gauge 42 has a terminal 46, which has a conductor 48. Emulator 44 has a terminal 50, which is connected to conductor 48 at one end thereof. Gauge 42 is disposed adjacent to the gunner area 34, so that a gunner can enter the gauge reading into a computer (not shown). Emulator 44 is mounted on casing 22 within the ammunition storage compartment 30.

Figure 2:
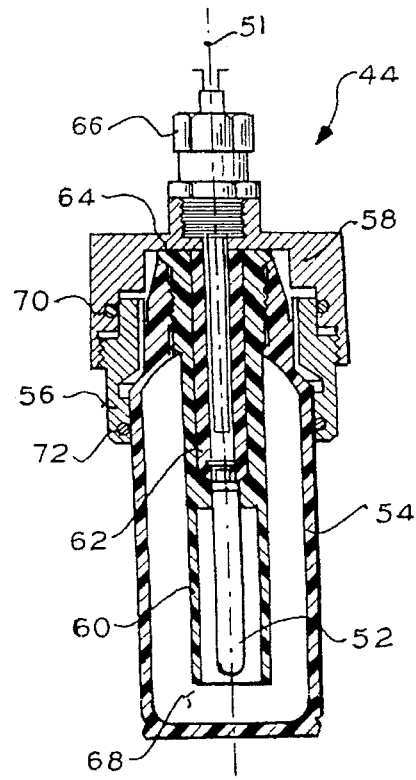
FIG. 2 is a section view of a portion of FIG. 1.

As shown in FIG. 2, emulator 44 which has an axis 51, includes a sensor bulb 52, a vacuum bottle 54, an adapter 56 which is air tight and which is threaded over bottle 54, a lid 58 which is air tight and which has a central threaded connection, is screwed over adapter 56, a thermal insert 60 which is threaded into bottle 54 and which is cylindrical in shape, and a split bulb lock 62 which fits inside thermal insert 60. Emulator 44 also has a gasket 64 which is composed of rubber-like material and which fits between insert 60 and lid 58, and a connector 66 which is liquid tight and which is threaded into lid 58 and which is connected to terminal 50. Bottle 54 encloses a sealed cavity 68, which receives insert 60. Lid 58 and adapter 56 have respective o-rings 70, 72.

Bottle 54, which is a vacuum bottle, serves to insulate sensor bulb 52 from the outside environment and forms the shell of emulator 44. Air-tight threaded adapter 56 mates with the threaded portion of lid 58. Air-tight screw-on lid 58 provides a closure of the emulator 44. Thermal insert 60 represents a portion of the thermal mass of the tank ammunition, which is 120 millimeter (mm) ammunition. Bulb lock 62 serves to keep an end of bulb 52 in place while it is inserted into emulator 44. Bulb 52 represents the balance of the thermal mass for the tank ammunition. Gasket 64 helps to keep emulator 44 in an air-tight condition. Liquid-tight connector 66 is attached to an outer cover of gauge conductor 48, and is used to keep an air-tight seal between armored plating of gauge conductor 48 and emulator 44. Emulator 44 measures temperature response versus time. Emulator 44 copies or emulates the temperature versus time of a 120 mm tank round when exposed to the same imposed external temperature variation. The temperature measured by emulator 44 thereby provides a measure of the ammunition propellant temperature. Thus, such measure or reading can be input to a ballistic computer (not shown) by the gunner, without requiring invasive means to directly measure the ammunition propellant temperature in the interior of the round.

The thermal insert 60 has a selective length in order to provide a desired time constant which corresponds to or simulates the time constant of the propellant of ammunition 19, 31.

Thermal insert 60 and bulb lock 62 are composed of a plastic material such as polyethylene material. Bottle 54 is a selective glass or plastic material. Adapter 56 and lid 58 are composed of a selective metal material or a selective plastic material.

The method of assembly of emulator 44 includes the steps as indicated hereafter. First, place bulb 52 through connector 66, which is attached to lid 58. Second, lock bulb 52 into place using split bulb lock 62. Third, place bulb lock 62 into thermal insert 60 which has already been placed in bottle 54. Fourth, turn or screw down the lid 58 until all threads on adapter 56 are fully engaged.

Figure 3:
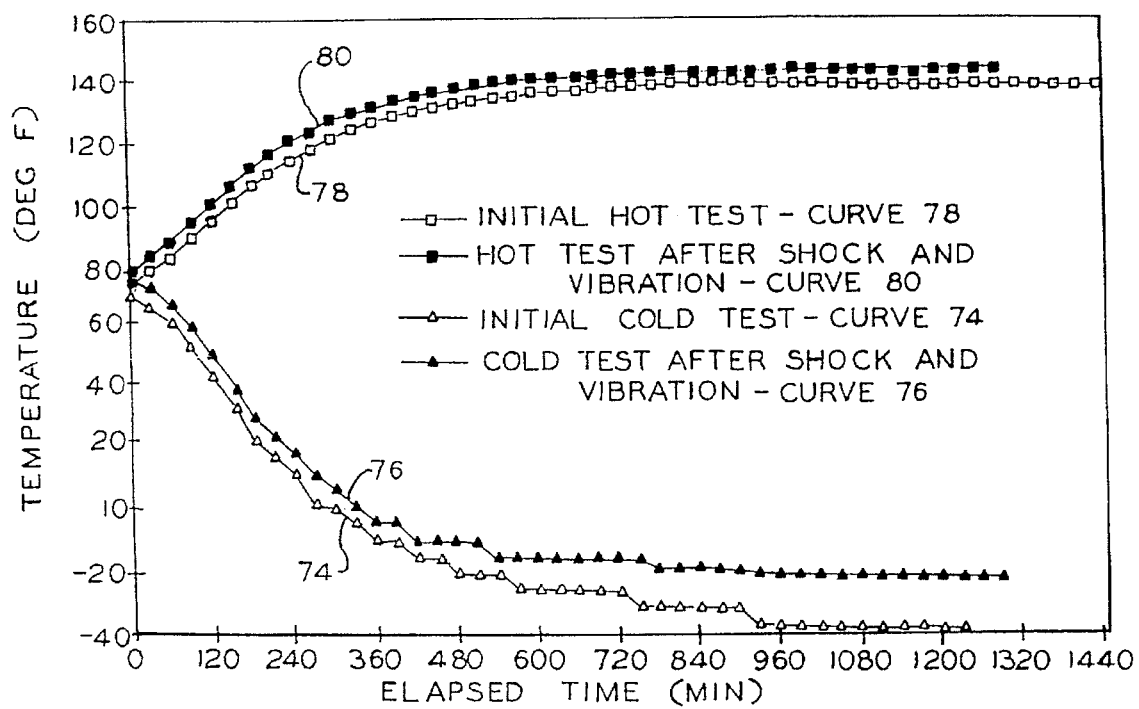
FIG. 3 is a graph of temperature in degrees Fahrenheit versus elapsed time in minutes having four test data curves.

Test data of a prototype is shown in FIGS. 3, 4, 5, 6 and 7. FIG. 3 is a graph of temperature, in degrees Fahrenheit, versus elapsed time, in minutes. FIG. 3 shows curves 74, 76, 78, 80. Curve 74 shows an initial cold test. Curve 76 shows the cold test after shock and vibration. Curve 78 shows an initial hot test. Curve 80 shows the hot test after shock and vibration.

Figure 4:
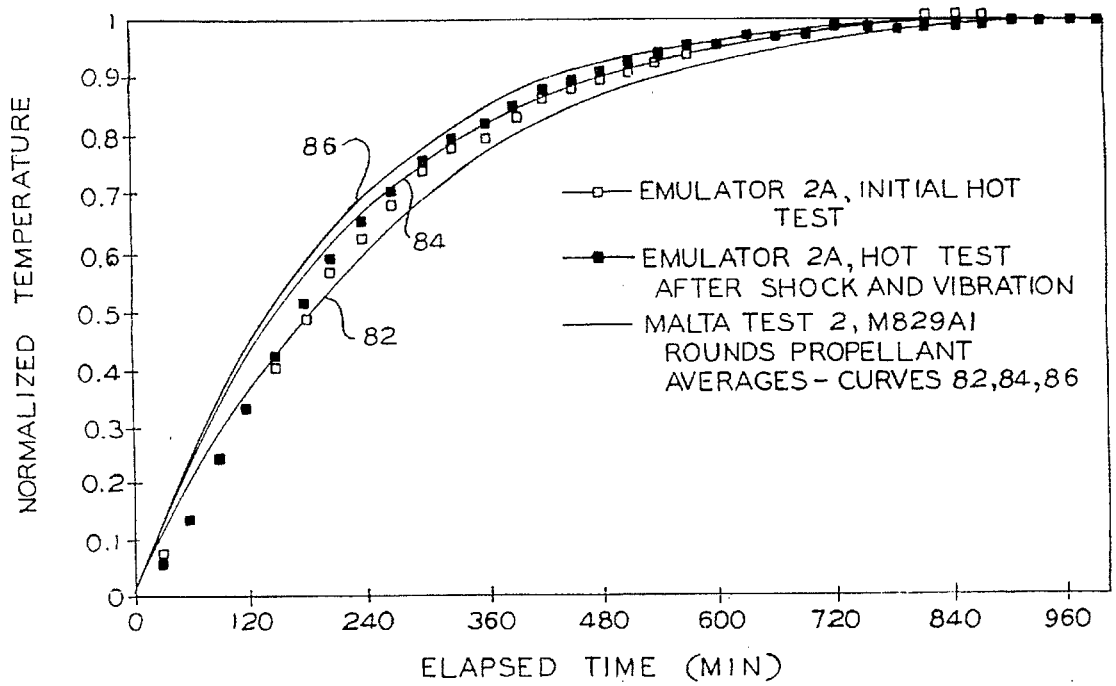
FIG. 4 is a graph of normalized temperature versus elapsed time in minutes having three test data curves.

FIG. 4 is a graph of normalized temperature versus elapsed time, in minutes. FIG. 4 shows curves 82, 84 and 86, which are propellant averages. FIG. 4 shows one set of readings for an emulator initial hot test and shows another set of readings or points for the emulator hot test after shock and vibration.

Figure 5:
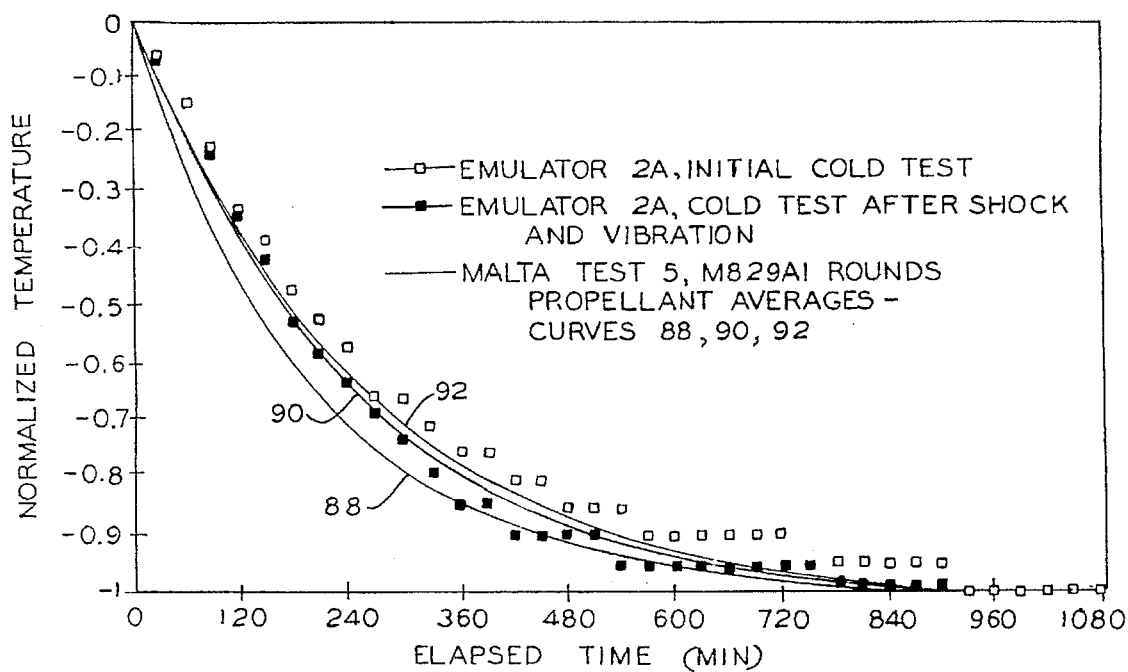
FIG. 5 is a graph of normalized temperature versus elapsed time in minutes having three test data curves.

FIG. 5 is a graph of normalized temperature versus elapsed time, in minutes. FIG. 5 shows curves 88, 90 and 92, which are propellant averages. FIG. 5 shows one set of readings for the emulator initial cold test and shows another set of readings for the emulator cold test after shock and vibration.

Figure 6:
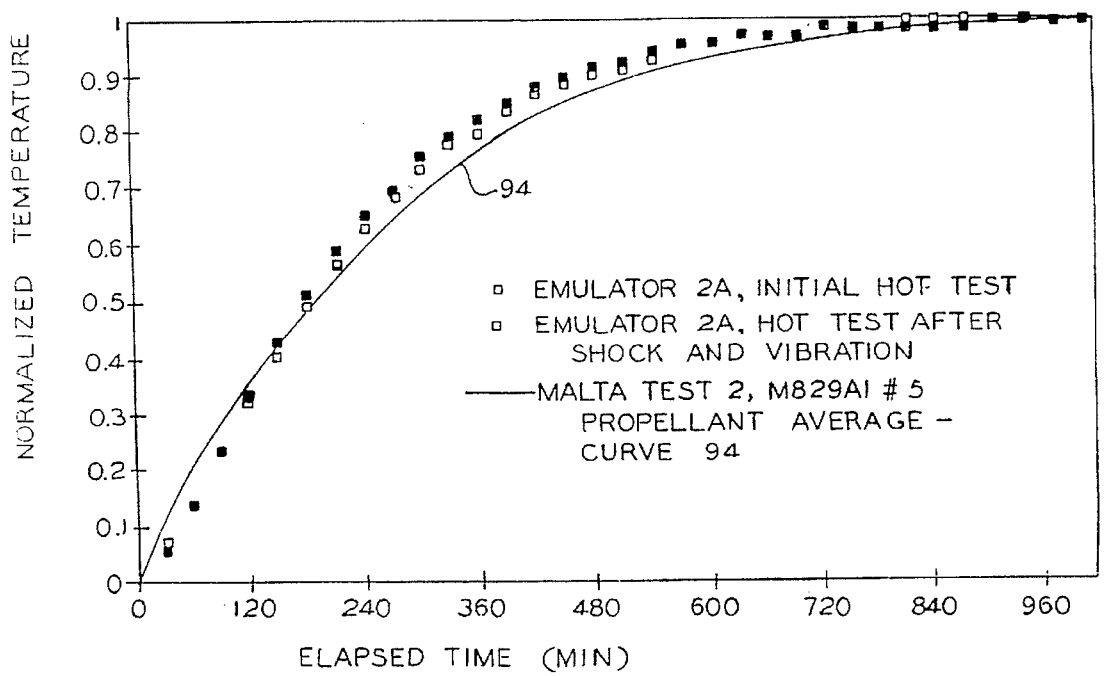
FIG. 6 is a graph of normalized temperature versus elapsed time in minutes having one test data curve.

FIG. 6 is a graph of normalized temperature versus elapsed time, in minutes. FIG. 6 shows curve 94 which is a propellant average. FIG. 6 shows one set of readings for the emulator initial hot test and shows another set of readings for the emulator hot test after shock and vibration.

Figure 7:
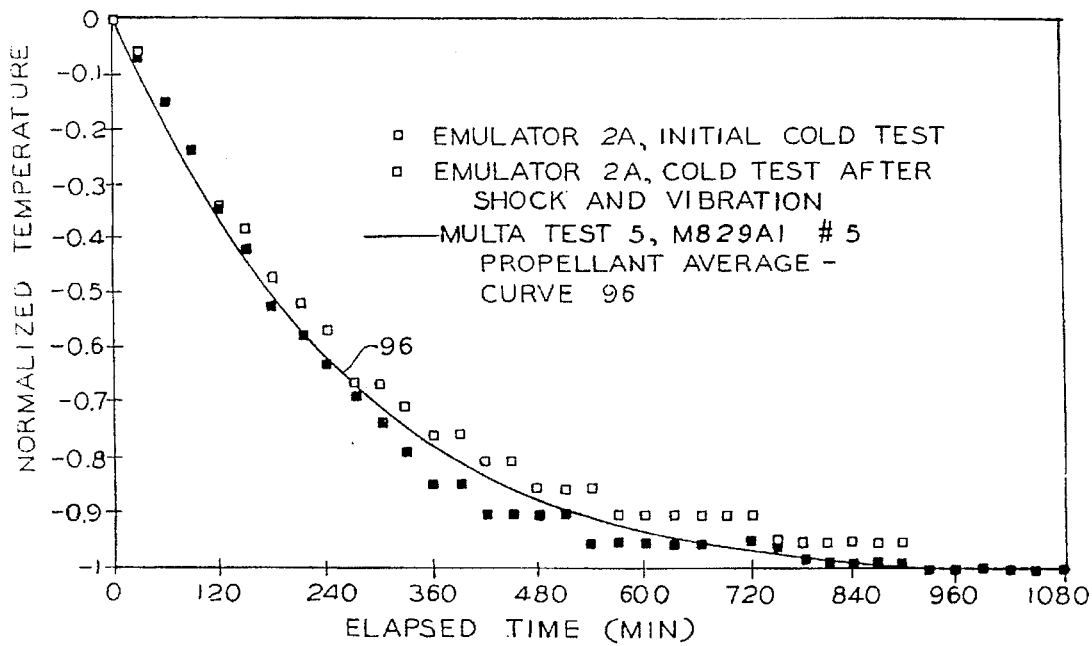
FIG. 7 is a graph of normalized temperature versus elapsed time in minutes having one test data curve.

FIG. 7 is a graph of normalized temperature versus elapsed time, in minutes. FIG. 7 shows curve 96 which is a propellant average. FIG. 7 shows one set of readings for the emulator initial cold test and shows another set of readings for the emulator cold test after shock and vibration.

The advantages of tank 10 and system 40 are indicated hereafter.

A) Tank 10 has improved gun firing accuracy.

B) System 40 facilitates the measurement of temperature of gun ammunition propellant which plays a significant role in gun firing accuracy.

C) System 40 copies the temperature of gun ammunition propellant in a shell and system 40 then provides a measurement of such temperature.

D) System 40 can accurately measure the temperature of a 120 mm tank ammunition propellant without the need to modify the existing round.

E) System 40 has an emulator 44 with a thermal insert 60 whose temperature copies the temperature of propellant of ammunition which is disposed adjacent thereto.

While the invention has been described in its preferred embodiment, it is to be understood that the words which have been used are words of description rather than limitation and that changes may be made within the purview of the appended claims without departing from the true scope and spirit of the invention in its broader aspects.

For example, thermal insert 60 and bulb lock 62 may be formed as a single piece.

As another example, lid 58 and thermal insert 60 and bulb lock 62 may be formed as a single piece.

As a further example, adapter 56 and lid 58 may have a snap-type connection therebetween instead of a threaded connection.

What is claimed is:

1. A temperature emulating system for use in gun systems, having ammunition with a propellant, said system comprising:

a means having a gauge for providing a temperature reading of a sensor bulb which emulates the temperature of the ammunition, said means having a conductor;

means connected to the conductor for sensing the temperature at the bulb and for transmission of such temperature to the gauge;

a vacuum bottle having a sealed cavity which receives the sensor bulb; and a thermal insert which is disposed in the cavity and which has a time constant that is about equal to a time constant of the propellant of the ammunition.

2. The system of claim 1, wherein the time constant of the thermal insert is adjustable in order to match it to the time constant of the propellant by modifying the length of the thermal insert.

3. The system of claim 2, wherein the thermal insert has a hollow portion which surrounds the sensor bulb, and wherein the vacuum bottle has a hollow portion which surrounds the insert.

4. The system of claim 3, wherein the system further includes:

a lid for closing the vacuum bottle;

an adapter having a threaded connection to the lid;

said adapter having a seal ring which bears against the bottle.

* * * * *